United States Patent [19]
Lo et al.

[11] Patent Number: 6,035,578
[45] Date of Patent: Mar. 14, 2000

[54] EFFICIENT EDIBLE-SPROUTS CULTURING STRUCTURE WITH ALL-STAGE SPROUTS CULTURING UNITS AND WATER-SAVING FEEDING/DRAINING SYSTEM ENABLING AUTOMATIC RECYCLING WATER BALANCE IN THE SPROUTS CULTURING UNITS

[76] Inventors: Kung-Shen Lo, No. 1-1, Lane 25, Min Chih St., Chung Ho, Taipei Hsien; Li-Tai Peng, 3F, No. 2-3, Alley 4, Lane 190, Sec. 7, Chung Shan N. Rd., Taipei, both of Taiwan

[21] Appl. No.: 08/954,233

[22] Filed: Oct. 20, 1997

[51] Int. Cl.⁷ .................................................. A01G 31/00
[52] U.S. Cl. ........................................................... 47/61
[58] Field of Search ............................... 47/14, 60, 61, 47/622, 63

[56] References Cited

U.S. PATENT DOCUMENTS

| | | | |
|---|---|---|---|
| 5,636,474 | 6/1997 | Lo | 47/61 |
| 5,822,920 | 10/1998 | Tsay | 47/61 |

FOREIGN PATENT DOCUMENTS

| | | | |
|---|---|---|---|
| 6-141713 | 5/1994 | Japan | 47/61 |
| 2 030 834 | 4/1980 | United Kingdom | 47/61 |
| 2 089 632 | 6/1982 | United Kingdom | 47/61 |
| PCT/US84/ 01097 | 1/1985 | WIPO | 47/61 |

*Primary Examiner*—Robert P. Swiatek
*Assistant Examiner*—Jeffrey L. Gellner
*Attorney, Agent, or Firm*—Smith, Gambrell & Russell, LLP

[57] ABSTRACT

Disclosed is a structure for efficiently culturing edible sprouts which mainly includes a plurality of all-stage sprouts culturing units each formed from a pressure-adjustable pressure cover member, a bean/seed support member, a growth frame and a sprouts culturing box, and a water-saving feeding/draining system that enables cultivation of edible sprouts completely in the same sprouts culturing boxes throughout all culturing stages, including the soaking of beans/seeds, the accelerating of germination, and the culturing of sprouts. The pressure cover member enables production of thicker sprouts within shortened time, and the water-saving feeding/draining system provides accurately and timely supply and drain of water to and from the sprouts culturing boxes and automatically regulates and balances recycling water level in the sprouts culturing boxes, and therefore enables mass production of sprouts with stable and good quality.

6 Claims, 7 Drawing Sheets

//6,035,578//

EFFICIENT EDIBLE-SPROUTS CULTURING STRUCTURE WITH ALL-STAGE SPROUTS CULTURING UNITS AND WATER-SAVING FEEDING/DRAINING SYSTEM ENABLING AUTOMATIC RECYCLING WATER BALANCE IN THE SPROUTS CULTURING UNITS

FIELD OF THE INVENTION

The present invention relates to an efficient edible-sprouts culturing structure with an all-stage sprouts culturing units and water-saving feeding/draining system enabling automatic recycling water balance in the sprouts culturing units, and more particularly to a set of sprouts culturing units being closely arranged and stacked to occupy as little room as possible and cooperating with a water-saving feeding/draining system which enables optimal water level and automatic recycling water balance in the sprouts culturing units, so as to well control production of high quality edible sprouts in a manner of scientific business management and mass production.

BACKGROUND OF THE INVENTION

Generally, there are three types of water feeding in edible sprouts cultivation, namely, showering type, spraying type, and soaking type. In the case of mass production of edible sprouts in a natural culturing method, that is, to culture sprouts without using any chemical fertilizer and/or pesticide, artificial ethylene, nitrogen, or antibiotic, and provided that water feeding and draining is under good control, the soaking type water feeding is usually better than the showering and the spraying type to culture sprouts of stable and high quality. (However, currently, most edible sprouts culturers directly or indirectly use the above mentioned chemicals.) However, a disadvantage of the culturing units using the soaking type water feeding commonly adopted by the culturers is high consumption of water. Moreover, it is difficult to control the volume and timing of water supply to the multiple layers of culturing units with one single water feeding means. And, the water shall have a raised temperature when it flows from units at upper layers to that at lower layers, resulting in insufficient lowering of temperature in the units at lower layers and accordingly irregular and inferior quality of the edible sprouts.

Moreover, water amount and water feeding interval required during the whole culturing process vary with different beans and seeds (such as mung beans, soy beans, small red beans, peas, etc.), as well as stages of culturing, that is, the beans/seeds soaking, the acceleration of germination, and the sprouts culturing. To complete the above three different culturing stages all in the same culturing container without the need of changing the culturing environment, it necessitates completely new sprouts culturing method and automatic water feeding system which saves time, labors, and water required to culture sprouts and thereby effectively reduces the culturing cost and increases the producer's competition ability in the market. One good way to achieve the above purpose is to culture the edible sprouts in an upstanding type farm.

An earlier invention of the inventor titled "Hydroponic means for culturing edible sprouts" which has been granted a U.S. Pat. No. 5,636,474 on Jun. 10, 1997 forms a primary framework of the present invention.

SUMMARY OF THE INVENTION

A primary object of the present invention is to provide an efficient edible-sprouts culturing structure with all-stage sprouts culturing units and water-saving feeding/draining system enabling automatic recycling water balance in the sprouts culturing units, so that all stages in the process of culturing edible sprouts, including the beans/seeds soaking, the acceleration of germination, and the sprouts culturing, can be completed in the same sprouts culturing units.

Another object of the present invention is to provide the above efficient edible-sprouts culturing structure for thoroughly solving the problem of drifting and inclining beans/seeds support members existing in the conventional culturing process, so as to prevent losses due to nonuniform sprout quality caused by uneven beans/seeds soaking in the culturing units. To solve the above problem, the present invention is provided with an pressure-adjustable pressure cover member. In a first embodiment of the present invention, the pressure cover member is associated with a bean/seed support member by means of elastic ring bands to be together positioned in a growth frame which is then fitly positioned in a sprouts culturing box with fixing seats, locating holes on the cover and the support member, respectively, engaging with locating pins on the culturing box. In a second embodiment, the associated pressure cover member and support member are stably positioned in the culturing box by mutually attracting or magnets separately positioned in the fixing seats of the cover member and the locating pins of the culturing box. In a third embodiment, the associated pressure cover and support member are stably positioned in the culturing box by locating bars inserted into the locating pins of the culturing box and the fixing seats of the cover member and having compression springs put around the locating bars. All these three embodiments enable the pressure cover member to move upward along with the upward enlongating sprouts and stop at a distance defined by the tension of the elastic ring bands, the magnetic repulsion between the magnets on the upward moved cover member and a culturing box at a higher layer, or the tension of the comprsssion springs. This also allows the sprout tissues to develop in lateral directions and produces thicker sprouts.

A further object of the present invention is to provide the above efficient edible-sprouts culturing structure which includes a water-saving feeding/draining system enabling automatic regulation and balance of recycling water supply to the sprouts culturing units, so that water is fully automatically supplied to and drained from the culturing units during the three stages of beans/seeds soaking, accelerating germination, and sprouts culturing for all different beans and/or seeds. This automatic water-saving feeding/draining system together with the pressure-adjustable pressure cover member promote quick growth of sprouts to enable mass production of consistent high quality edible sprouts.

BRIEF DESCRIPTION OF THE DRAWINGS

The structure and functions of the present invention can be best understood by referring to the following detailed description of the preferred embodiment and the accompanying drawings, wherein.

DETAILED DESCRIPTION OF THE PREFERRED EMBODIMENT

Figure 1:
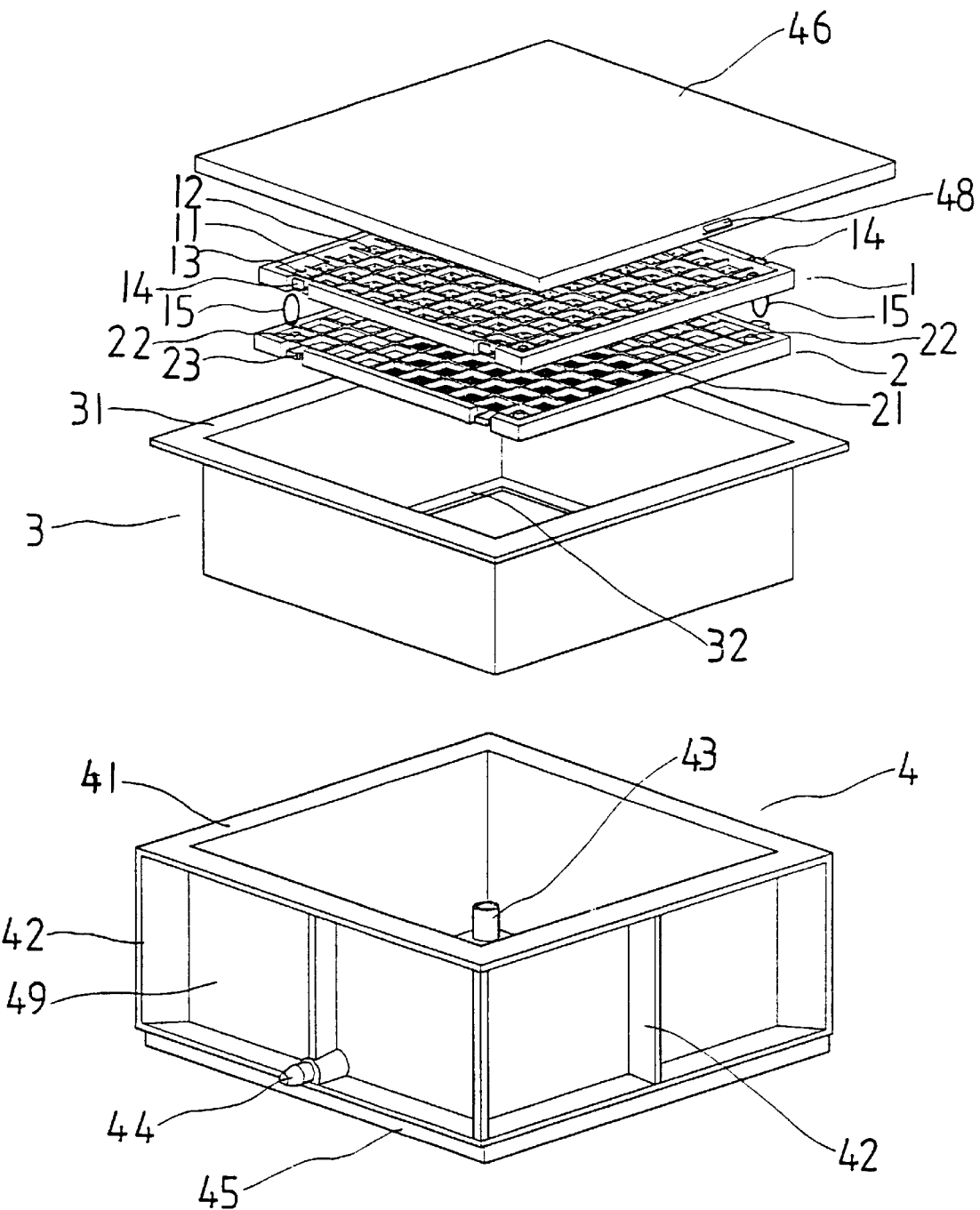
FIG. 1 is an exploded perspective of a culturing unit according to the present invention.

Please refer to FIGS. 1 to 4. The present invention relates to an efficient structure for culturing edible sprouts and mainly includes a number of all-stage sprouts culturing boxes 4 closely arranged and stacked on a horizontal surface 6 and a complete set of water-saving feeding/draining system 7 regulated by a programmable electronic controller for automatically regulating and balancing recycling water level in the sprouts culturing boxes 4. Each sprouts culturing box 4 contains therein at least a set of superposed pressure-adjustable air/water permeable pressure cover member 1 and latticed bean/seed support member 2. The cover member 1 and the bean/seed support member 2 can be detachably associated with one another by different means which will be described in more details later. The cover member 1 may resist an upward force from the growing sprouts in the support member 2 without interfering with the growing of sprouts in an environment having endogenous ethylene. The water-saving feeding/draining system 7 supplies and drains water to and from the sprouts culturing boxes 4 via quick coupling hoses 5. A water reservoir 8 stores water drained from the sprouts culturing boxes 4. The assembled pressure cover members 1 and bean/seed support members 2 can be contained in the same sprouts culturing boxes 4 to provide the optimum sprouts growing environment without the need to be moved to other containers at different sprouts growing stages as in other culturing methods.

Figure 2:
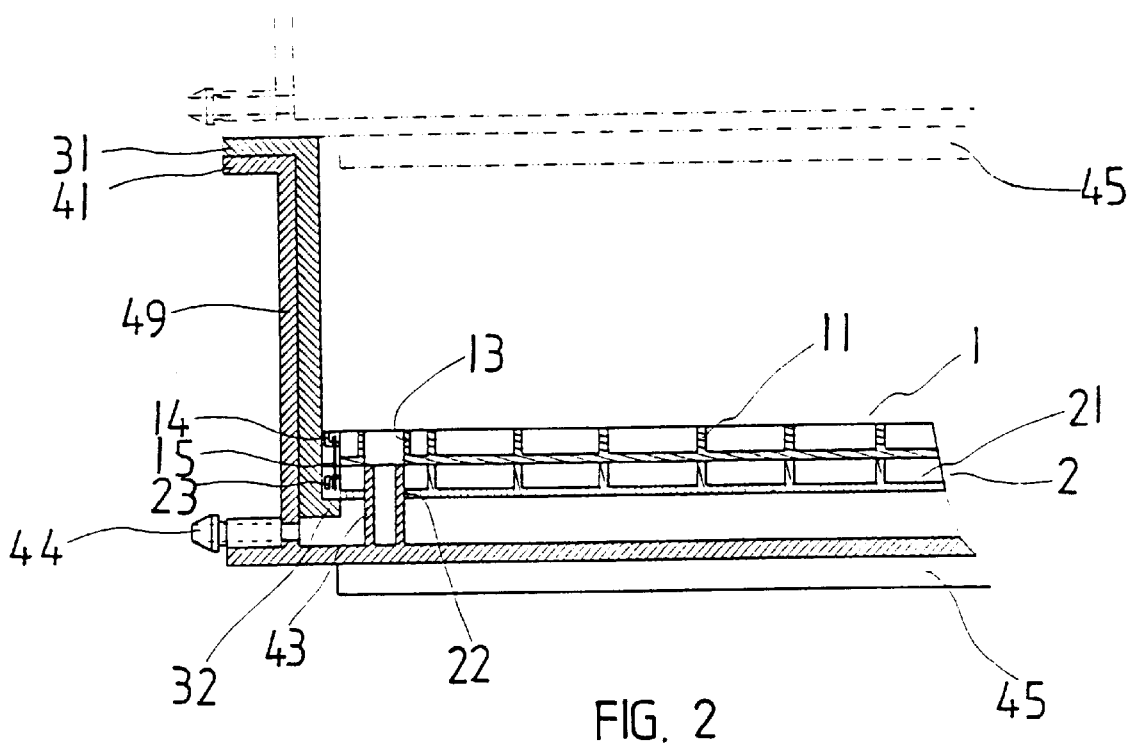
FIG. 2 is a fragmentary sectional view of the culturing unit of FIG. 1 in an assembled state.

Please now refer to FIGS. 1 and 2. The pressure-adjustable air/water permeable cover member 1 each has a plurality of integrally formed crossed reinforcing ribs 11 and four side walls which together define a plurality of small open compartments 12 for air/water penetration, so that water and gas produced by the sprouts during their growth may smoothly flow and circulate in the culturing box 4 throughout the sprouts culturing. Open fixing seats 13 are provided near four corners of the pressure cover member 1. Upper hooks 14 are formed on one pair of two opposite side walls of the pressure cover member 1 for each receiving an end of an elastic ring band 15.

The bean/seed support member 2 each also has a plurality of integrally formed crossed ribs and four side walls which together define a plurality of small compartments corresponding to the compartments 12 of the cover member 1. Each compartment of the member 2 has a bean/seed bedding bottom formed from a porous screen 21. Lower hooks 23 are formed on one pair of two opposite side walls of member 2 to correspond to the upper hooks 14 of member 1 for each receiving another end of the elastic ring band 15, so that elastic ring bands 15 may detachably bind the superposed member 1 and member 2 together. Locating holes 22 are integrally formed near four corners of the bean/seed support member 2 corresponding to the fixing seats 13 of the pressure cover member 1. When the member 1 and member 2 are superposed and associated with one another by the elastic ring bands 15 binding the upper and the lower hooks 14 and 23, beans/seeds positioned on the bedding screens 21 of member 2 below the cover member 1 are prevented from piling on the member 2 during a soaking stage. The associated pressure cover member 1 and bean/seed support member 2 are disposed in a growth frame 3 on inward extended bottom flanges 32 thereof. The growth frame 3 also has outward extended top flanges 31 which are overlaid on top flanges 41 of the culturing box 4, permitting the growth frame 3 to dispose in the culturing box 4 with its outer wall surfaces fitly abutting against side walls 49 of the culturing box 4 and its lower edges located above and away from a water suface in the culturing box 4 at a predetermined distance. This distance prevents the beans/seeds on the bedding screens 21 from soaking in water for a prolonged period of time while allows roots of the sprouts to extend downward to absorb sufficient water from the culturing box 4.

The elastic ring band 15 is made of special water-resistant material to possess a predetermined tension which is strong enough to suppress continuous sprouts elongation in vertical direction between the pressure cover member 1 and the bean/seed support member 2 bound together by the elastic ring bands 15, and thereby promotes sideward growth of sprout tissues.

The culturing box 4 is used to contain at least one set of superposed and bound pressure cover member 1 and bean/seed support member 2 and the growth frame 3. Each culturing box 4 is provided at a top with outward extended flanges 41, at a bottom with downward extended flanges 45, and on outer side wall surfaces with reinforcing ribs 42 to ensure sufficient rigidity while effectively reduce weight of the box 4. An exterior connecting head 44 is provided at one side wall of the box 4 at a proper height. Upward projected locating pins 43 are provided in the box 4 corresponding to the fxing seats 13 and the locating holes 22 on the pressure cover member 1 and the bean/seed support member 2, respectively, so that the associated member 1 and member 2 along with the growth frame 3 may be more easily stably positioned in the box 4 by engaging the locating pins 43 into the fixing seats 13 and the locating holes 22.

The quick coupling hose 5 is connected at one end to the exterior connecting head 44 and at the other end to the water-saving feeding/draining system 7 to permit quick connection and/or disconnection of the culturing box 4 to and/or from the water-saving feeding/draining system 7. In addition to provide water to all the sprout culturing boxes 4, the hose 5 also facilitates cleaning of the boxes 4 after each crop of sprouts.

Figure 5:
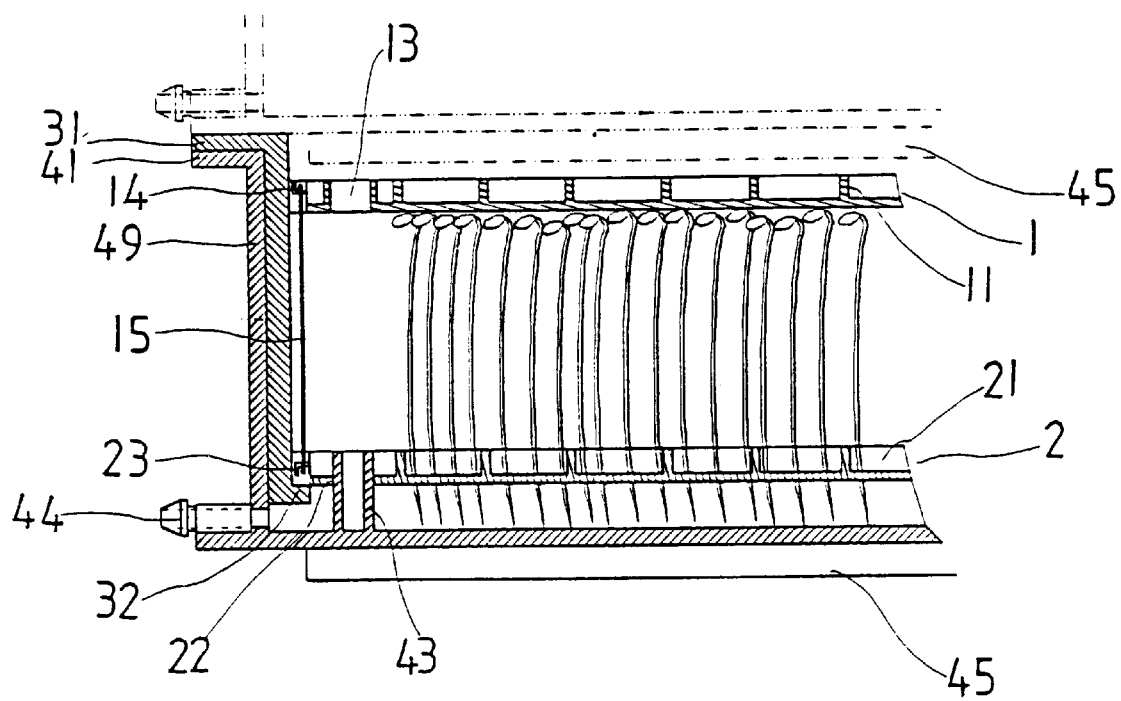
FIG. 5 is a fragmentary sectional view of the assembled sprouts culturing unit shousing the manner in which sprouts grow in the unit.

To culture edible sprouts with the boxes 4 and the pressure cover member 1, the bean/seed support member 2 and the growth frame 3 included in the sprouts culturing unit of the present invention, first evenly spread beans/seeds on the bean/seed support member 2 and then superpose the pressure cover member 1 on the support member 2, and put the elastic ring bands 15 around the upper and lower hooks 14, 23 to bind the two members 1, 2 together. Then, as shown in FIG. 5, put the growth frame 3 into the box 4 and place the already associated member 1 and member 2 into the growth frame 3 while always keep the two members 1 and 2 in a horizontal position. Be sure to lay the bottom of the member 2 on the bottom flanges 32 of the growth frame 3.

Finally, use a top cover 46 with a handle 48 to cover a top opening of a topmost box 4 to complete the stacking of one upright row of sprouts culturing units. This way proves the present invention may effectively prevents the associated bean/seed support member 2 and pressure cover member 1 and the growth frame 3 from drifting and/or becoming inclined in the culturing box 4, allowing even soaking of beans/seeds on the support member 2 throughout the process of sprouts cultivation. According to the present invention, up to fifteen culturing boxes 4 can be successively stacked, which is much higher than the three boxes that can be stacked in conventional culturing structures currently available in the market. This enables multiplied throughput which is several times of that can be achieved in conventional cultivation methods. The present invention is highly efficient in terms of its effective utilization of space and high and quality throughput.

Figure 3:
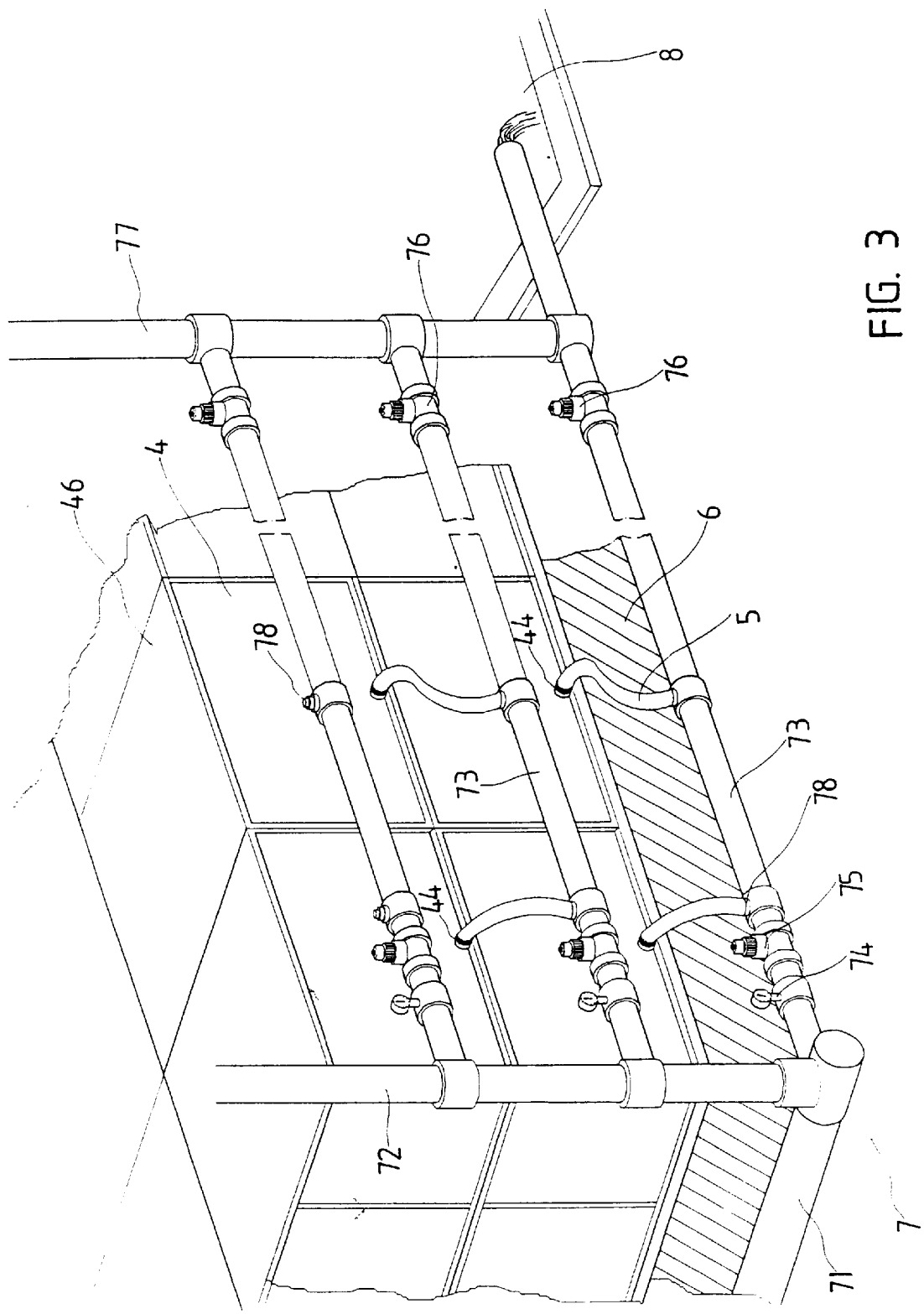
FIG. 3 illustrates a part of the water-saving feeding/draining system for automatically regulating and balancing recycling water level in the sprouts culturing units of the present invention.
Figure 4:
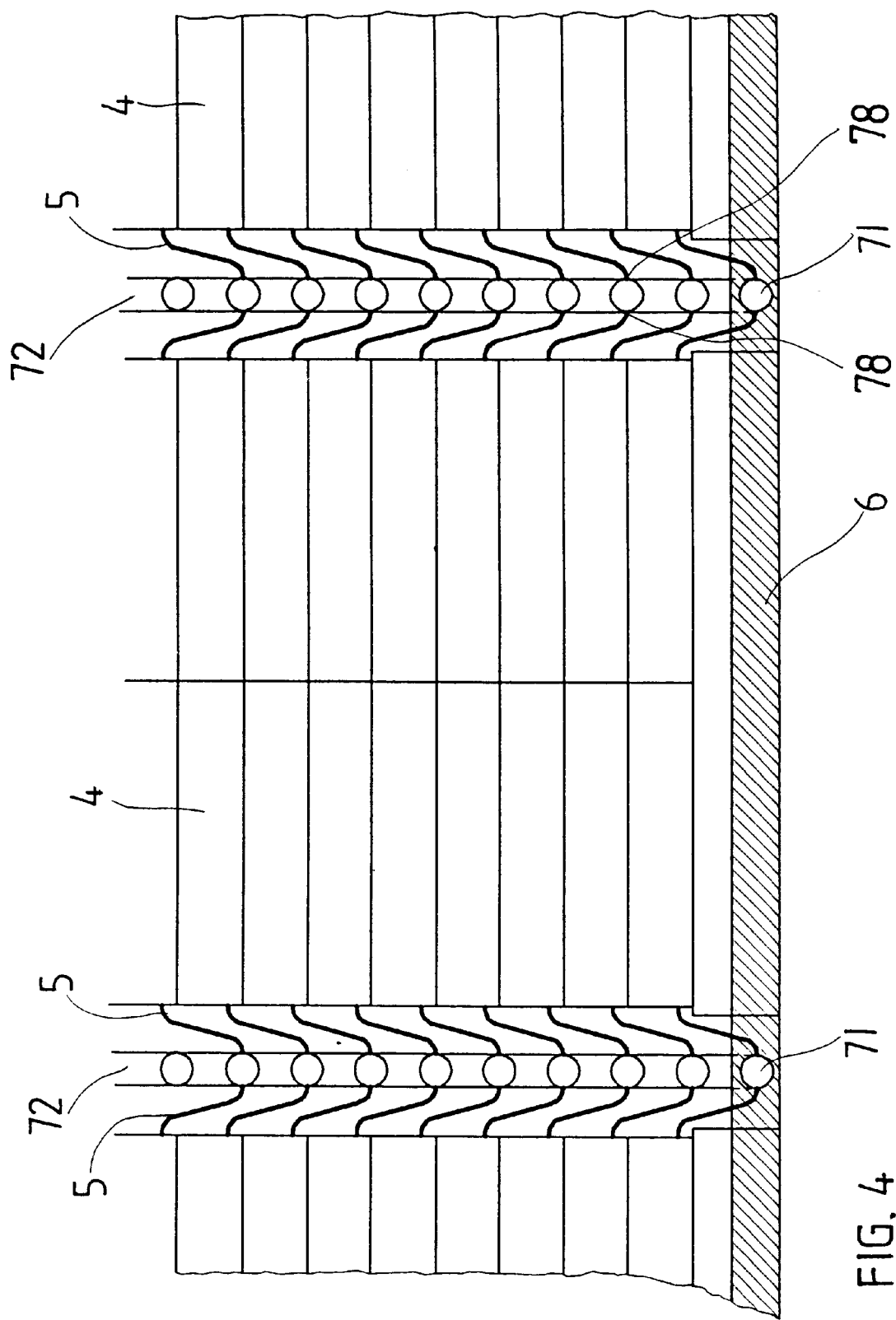
FIG. 4 is a schematic elevational plan view showing an example of well-planned arrangement of sprouts culturing units and water-saving feeding/draining system according to the present invention.

Please now refer to FIGS. 3 and 4 which illustrate the water-saving feeding/draining system 7 according to the present invention for automatically regulating and balancing recycling water level in the sprouts culturing boxes 4 during the whole process of sprouts culturing, including the stages of beans/seeds soaking, accelerating germination, and culturing sprouts. Multiple sprouts culturing units each formed from at least one pressure cover member 1, one bean/seed support member 2, and one growth frame 3 together put into a sprouts culturing box 4 are stacked and closely arranged in multiple rows on a horizontal platform 6 with the side walls having the exterior connecting heads 44 facing the same direction. The water-saving feeding/draining system 7 includes at least one main 71 connected at one end to a water supply source (not shown), at least one vertical feeding branch pipe 72 connected at a lower end to another end of the main 71 opposite to the water source, a plurality of horizontal branch pipes 73 being equally spaced to each correspond to a level of sprouts culturing boxes 4 and being connected at one end to the vertical feeding branch pipe 72, a water pressure regulating valve 74 for controlling water pressure and a first normally-close type electromagnetic valve 75 connected to one end of each horizontal branch pipe 73 joining the vertical feeding branch pipe 72, at least one vertical draining branch pipe 77 to which another end of the horizontal branch pipes 73 are connected, and a plurality of second normally-close type electromagnetic valves 76 connected to another end of each horizontal branch pipe 73 joining the vertical draining branch pipe 77. The first electromagnetic valves 75 control supply of water from the vertical feeding branch pipe 72 to the horizontal branch pipes 73 and are electrically connected to a timer (not shown) and accurately controlled by programmable controllers. A plurality of quick connecting seats 78 are equally spaced along the horizontal branch pipes 73 to receive one end of the quick coupling hoses 5 of which another end is connected to the exterior connecting heads 44 on the sprouts culturing boxes 4, so that water can be quickly introduced from the vertical feeding branch pipe 72 into the culturing boxes 4. When water supplied into the boxes 4 exceeds a level of the quick coupling hoses 5, the second electromagnetic valves 76 are opened to drain extra water in the boxes 4 into a reservoir 8 via the horizontal branch pipes 73 and the vertical draining branch pipe 77. This water-saving feeding/draining system 7 facilitates cultivation of sprouts in the manner of mass production and enables production of consistent high quality edible sprouts.

The water pressure regulating valves 74 may effectively control supply of water from the vertical feeding branch pipe 72 to every horizontal branch pipes 73, and accordingly to all sprouts culturing boxes 4, at a constant pressure. This constant water pressure also facilitates even water soaking of beans/seeds in the support member 2. Water may be supplied to different rows of the sprouts culturing boxes 4 at different time, so that sprouts cultured at different arears can be cropped sequentially to allow sufficient elongation of sprouts.

FIG. 4 is an elevational plan view showing the relation between the sprouts culturing boxes 4 and the water-saving feeding/draining system 7 of the present invention. Wherein, each quick connecting seat 78 on the horizontal branch pipes 73 may have two outlets for connecting two hoses 5 thereto at the same time. With the present invention, edible sprouts can be produced in an intensive cultivation manner without wasting too much room.

Figure 6:
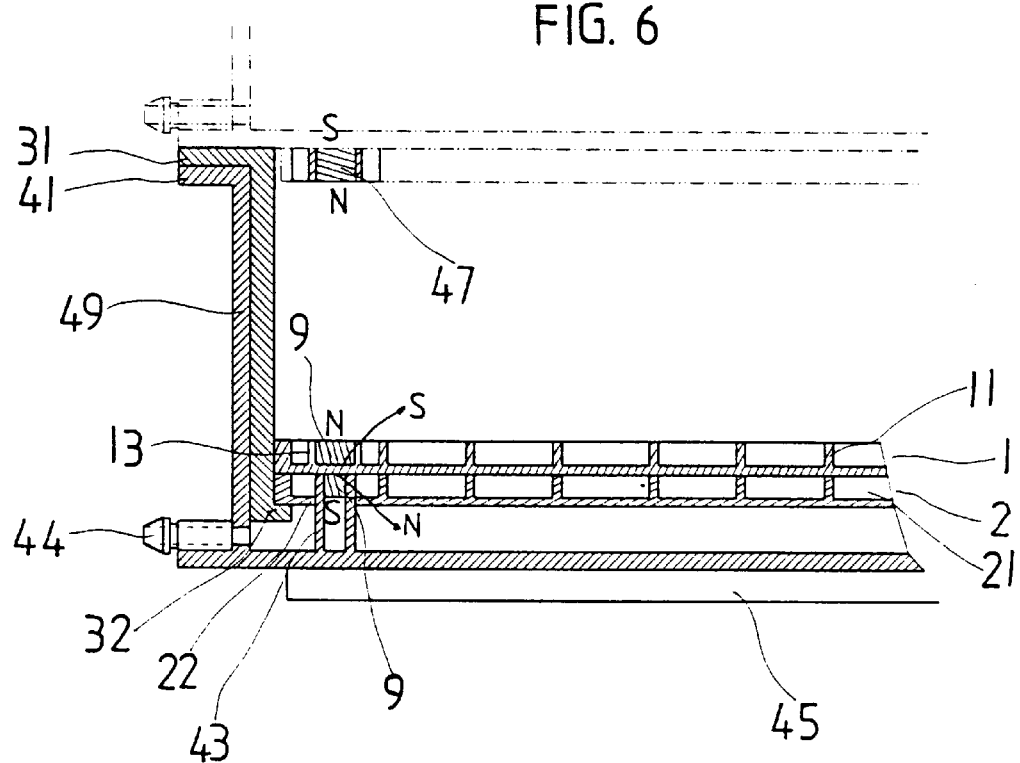
FIG. 6 is a fragmentary sectional view similar to FIG. 2 but with a different way of associating the culturing members with one another.
Figure 7:
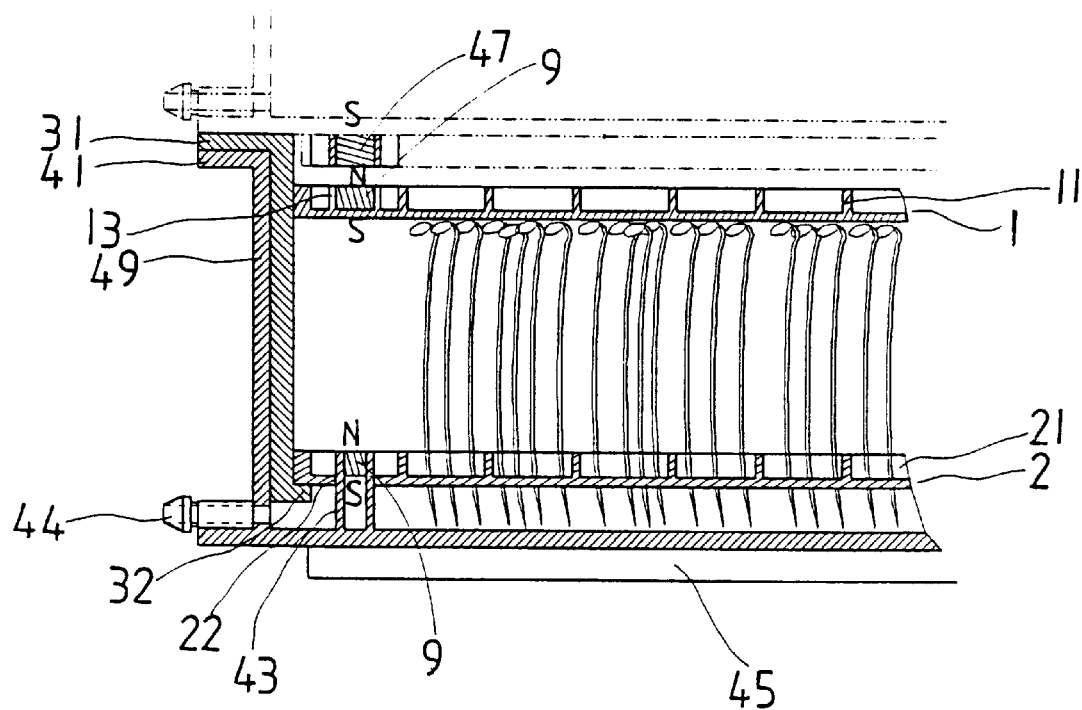
FIG. 7 is a fragmentary sectional view showing sprouts growing in the culturing unit of FIG. 6.

Please now refer to FIG. 6 in which another embodiment of the sprouts culturing unit of the present invention is shown. In this embodiment, magnets 9 are used to achieve the same effect as that provided by the elastic ring bands 15 while preventing the associated members 1 and 2 from drifting in the culturing box 4. A first magnet 9 is disposed at an inner top of each locating pin 43 of the sprouts culturing box 4 with the magnetic poles S and N located as indicated in the drawing. A second magnet 9 is disposed in each fixing seat 13 of the pressure-adjustable air/water permeable pressure cover member 1 with the magnetic poles S and N located as indicated in the drawing. When the superposed member 1 and member 2 and the growth frame 3 are positioned in the culturing box 4 as previously described, the first and the second magnets 9 magnetically attract one another to cause the member 1 and the member 2 to closely contact with one another. The beans/seeds laid on the latticed support member 2 and soaked in water shall germinate and the roots shall extend downward for water. The downward extending roots of the sprouts make the beans/seeds firmly bedding on the screen 21 while the sprouts keep on growing. When the sprouts elongate in a direction as indicated in FIG. 7, they shall force the pressure-adjustable air/water permeable pressure cover member 1 to gradually move upward. When the sprouts elongate to a desired length, the pressure cover member 1 is pushed upward to finally get close to a bottom surface of another culturing box 4 superposed on the first lower box 4. Since there is a third magnet 47 provided to the bottom surface of the upper box 4 corresponding to each second magnet 9 with two similar magnetic poles facing each other, the third magnets 47 exert a downward pressure on the member 1 when it approaches to the box 4 at an upper layer. This downward pressure prevents the sprouts from further elongating and the sprout tissues begin to grow in lateral directions to produce firm and thick sprouts which are high quality and tasting delicious. The first and second magnets 9 in the locating pins 43 of the culturing box 4 and the fixing seats 13 of the pressure cover member 1 also effectively prevent the associated member 1 and member 2 from drifting and inclining in the box 4 and therefore eliminate any loss of failed culturing of sprouts caused by uneven beans/seeds soaking in the box 4.

Figure 8:
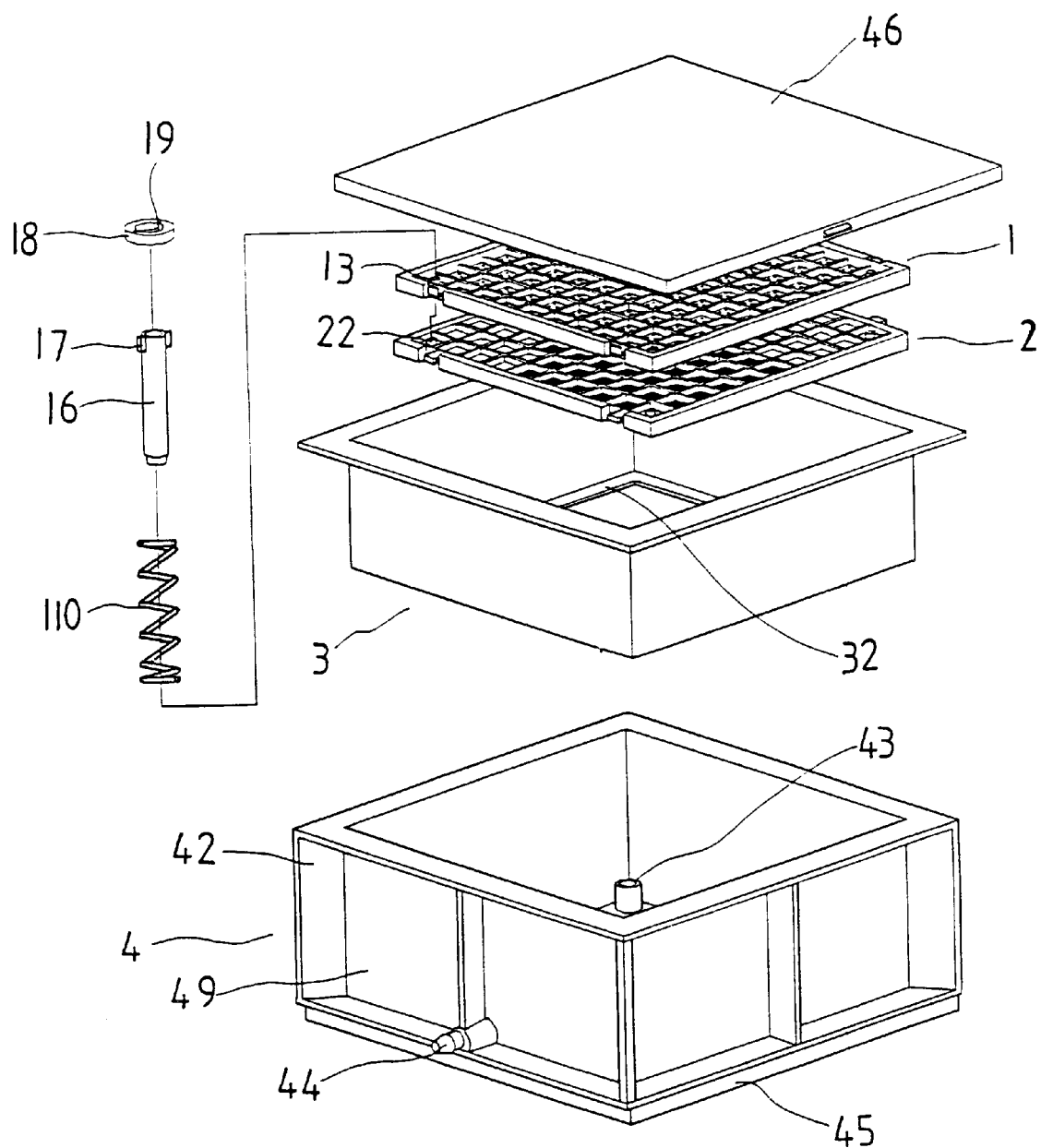
FIG. 8 is an exploded perspective showing a further embodiment of the culturing unit according to the present invention.
Figure 9:
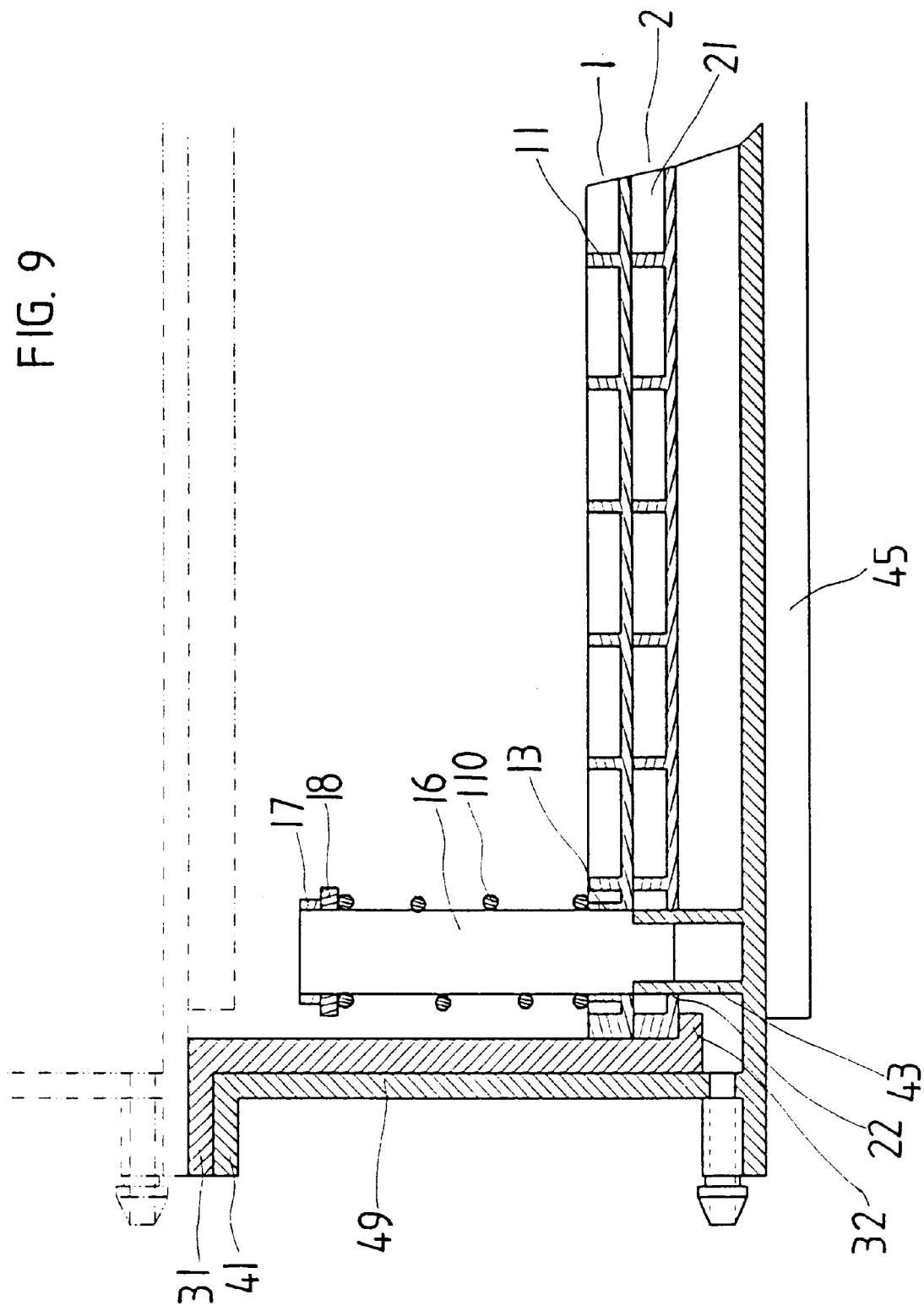
FIG. 9 is an enlarged, fragmentary, sectional view of the culturing unit of FIG. 8 in an assembled state.

Please further refer to FIG. 8 in which a third embodiment of the present invention is shown. In this embodiment, compression springs 110 are used to replace the magnets 9. After the superposed member 1 and member 2 are disposed in the growth frame 3 on the bottom flanges 32, four compression springs 110 are sequentially put in the fixing seats 13 near four corners of the pressure cover member 1, and then, a fixing bar 16 is inserted at a reduced bottom end through each compression spring 110 and into the locating pin 43 of the culturing box 4. An annular ring 18 is put around a top end of each fixing bar 16. Two notches 19 are formed along an inner circumference of each annular ring 18 to engage with two wings 17 projecting from a top outer periphery of the fixing bar 16. Align the notches 19 with the wings 17 of the fixing bar 16 and press the annular ring 18 downward to pass the wings of the fixing bar 16 and turn the annular ring 18 for a certain degrees, so that the annular ring 18 is retained to the fixing bar 16 below the wings 17 and therefore holds the compression spring 110 in place between the annular ring 18 and the fixing seat 13. Alternately, the fixing bars 16 may be inserted at their reduced bottom ends into the locating pins 43 of the culturing box 4, and then the growth frame 3, the beans/seeds support member 2, and the pressure cover member 1 are sequentially positioned into the box 4. Finally, put the compression springs 110 and the annular rings 18 around the fixing bars 16 and use the same way to retain the annular rings 18 to the fixing bars 16 and therefore confine the compression springs 110 in place. FIG. 9 is an enlarged, fragmentary, sectional view of a sprouts culturing unit assembled in the above described way.

Please refer back to FIG. 5. In the water-saving feeding/draining system 7 of the present invention, the quick coupling hoses 5 are connected at one higher end to the exterior connecting beads 44 provided at the low position of the culturing boxes 4 and at another lower end to the quick connecting seats 78 provided on the equally spaced horizontal branch pipes 73 at positions lower than the exterior connecting heads 44. The electromagnetic valves 75 and 76 respectively mounted at a begining and an end of each horizontal branch pipe 73 are controlled by programmable electronic controllers (not shown) to control the amount and interval of water supply to the culturing boxes 4 and the water level in the culturing boxes 4. By this way, different types of beans/seeds can be automatically cultured to produce edible sprouts even in different seasons or at different temperatures by properly setting the water pressure regulating valves 74 and the electromagnetic valves 75, 76 which control the supply and drain of water to and from the boxes 4. Moreover, due to the hoses 5 which communicate the boxes 4 with the horizontal branch pipes 73, water supplied to the boxes 4 in the same level can quickly become balanced and extra water can be quickly drained, too. That means, the sprouts may evenly absorb water and dissipate heat. The problem of water feeding and draining usually faced by the "upstanding" type production is therefore successfully solved in the present invention.

From experiments conducted on the efficient edible-sprouts culturing structure according to the present invention during a long period of time, with water drained from the sprouts culturing boxes 4 being filtered and recycled to mix with fresh water for reuse in the boxes 4, it is found that a yield of root-removed sprouts within 120 hours (or 5 days) in winter or 80 hours (or 3.3 days) in summer is ten times of that when cultured with conventional methods. For sprouts before removing the roots and bean/seed skins, the yield from the present invention has a weight about 13 times of the weight of total spread beans/seeds, while the yield from conventional culturing methods is only six to eight times of the beans/seeds by weight. In the conventional culturing methods, the roots of sprouts can not be uniformly removed. Moreover, the sprouts cultured with the present invention have an average diameter from 3 mm to 4.0 mm with even length and have white color and taste sweet and crisp.

With the above arrangements, the present invention enables cultivation of edible sprouts completely in the same culturing units with water-saving feeding/draining system which automatically regulates and balances recycling water level in the culturing boxes. The culturing boxes of the present invention can be stacked to occupy minimum space while allow intensive cultivation of edible sprouts. The automatic regulating water feeding/draining system allows the edible sprouts to grow under control and therefore have stable and high quality. The cultivation of edible sprouts can therefore be controlled in a scientific and business management manner to achieve mass production.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. An efficient edible-sprouts culturing structure with all-stage sprouts culturing units and water-saving feeding/draining system enabling water regulation and automatic recycling water balance in said sprouts culturing units, comprising:

at least one sprouts culturing box suitable for superposing on one another, each said sprouts culturing box including a body defined by four side walls and a bottom, an exterior hose connecting head formed on one of said side walls, top flanges outward extending from top edges of said side walls, locating pins upwardly projecting from said bottom of said box body, and bottom flanges downwardly projecting from said bottom of said box body;

at least one pressure-adjustable air/water permeable pressure cover member, each said pressure cover member including a plurality of integrally formed crossed reinforcing ribs and four side walls which together define a plurality of small open compartments on said pressure cover member for air and water to flow therethrough, upper hooks being formed on one pair of two opposite side walls for each receiving one end of an elastic ring band, and fixing seats being formed on said side walls at positions corresponding to said locating pins of said sprouts culturing box;

at least one bean/seed support member, each said support member including a plurality of integrally formed crossed ribs and four side walls which together define a plurality of small compartments corresponding to said small open compartments of said pressure cover member, said small compartments of said support member having a bean/seed bedding bottom formed from a porous screen, lower hooks being formed on one pair of two opposite side walls of said support member corresponding to said upper hooks of said pressure cover member for each receiving another end of said elastic ring band, and open locating holes being formed on said side walls corresponding to said fixing seats on said pressure cover member;

a growth frame defined by four side walls and having top flanges horizontally and outward extending from top edges of said side walls for overlaying on said top flanges of said culturing box, and bottom flanges horizontally and inward extending from bottom edges of said side walls for supporting said pressure cover member and said bean/seed support member in said growth frame;

a binding means for attaching said pressure cover member to said support member;

a horizontal platform on which said sprouts culturing boxes are superposed on one another and closely arranged in multiple rows, said platform being preferably raised from a ground surface for a predetermined distance;

a plurality of quick coupling hoses, each said quick coupling hose being connected at one end to one of said exterior hose connecting heads on said sprouts culturing boxes;

at least one box cover for covering one said sprouts culturing box that is located at a top of said multiple superposed sprouts culturing boxes, said box cover being provided at two opposite ends with two handles; and a water feeding/draining system provided near one side of said superposed sprouts culturing boxes having said exterior hose connecting heads, said water feeding/draining system being controlled by a programmable electronic controller to supply and drain water to and from said sprouts culturing boxes at predetermined intervals and to timely regulate and balance water level in said sprouts culturing boxes.

2. An efficient edible-sprouts culturing structure as claimed in claim 1, wherein said sprouts culturing boxes are superposed on one another and closely arranged in multiple rows with their sides having said exterior hose connecting heads facing the same direction, and wherein said water-saving feeding/draining system is provided at a position generally in front of said sides of said superposed culturing boxes having said exterior hose connecting heads, and said water-saving feeding/draining system including at least one main connected at one end to a water supply source, at least one vertical feeding branch pipe connected at a lower end to another end of said main opposite to the water source, a plurality of horizontal branch pipes being equally spaced to each correspond to a level of said sprouts culturing boxes and being connected at one end to said vertical feeding branch pipe, a plurality of water pressure regulating valves with pressure gauges separately connected near to joints of said vertical and said horizontal feeding branch pipes, a plurality of first normally-close type electromagnetic valves separately connected to said horizontal branch pipes near said pressure regulating valves, at least one vertical draining branch pipe to which another end of said horizontal branch pipes are connected, and a plurality of second normally-close type electromagnetic valves separately connected near to joints of said horizontal branch pipes and said vertical draining branch pipe, said first electromagnetic valves controlling supply of water from said vertical feeding branch pipe to said horizontal branch pipes and being electrically connected to a timer to accurately control the above water supply in a timely manner; a plurality of quick connecting seats being equally spaced along said horizontal branch pipes to receive one end of said quick coupling hoses of which another end is connected to said exterior hose connecting heads on said sprouts culturing boxes, so that water can be quickly introduced from said vertical feeding branch pipe into said culturing boxes; said second electromagnetic valves being automatically opened to drain extra water in said culturing boxes into an external reservoir via said vertical draining branch pipe when water supplied into said culturing boxes exceeds a level of said quick coupling hoses; and said water discharged into said reservoir being filtered and mixed with fresh water for recycling.

3. An efficient edible-sprouts culturing structure as claimed in claim 2, wherein said quick connecting seats on said horizontal branch pipes of said watersaving feeding/draining system each has two outlets to receive two quick coupling hoses at the same time.

4. An efficient edible-sprouts culturing structure as claimed in claim 3, wherein said culturing box each is provided at an inner top of each said locating pin with a first magnet, and said pressure cover member is provided in each said fixing seat with a second magnet, such that said first and said second magnets magnetically attract one another, and wherein each said culturing box other than said culturing box at a lowest position is provided at said bottom near each corner with a third magnet corresponding to said first and said second magnets, such that said third magnets magnetically repulse said second magnets.

5. An efficient edible-sprouts culturing structure as claimed in claim 3 further comprising compression springs, fixing bars, and annular rings; said compression spring each being put over one of said fixing seats of said pressure cover member, said fixing bars each being inserted at a reduced bottom end thereof through one said compression spring and into one said locating pin of said culturing box, said annular ring each being put around a top end of one said fixing bar with notches on said annular ring aligned with wings on said fixing bar, such that when said annular ring passes said wings on said fixing bar and is turned for some degrees, said annular ring is retained to said fixing bar and holds said compression spring in place between said fixing seat of said pressure cover member and said annular ring.

6. An efficient edible-sprouts culturing structure as claimed in claim 3, wherein said binding means provided is an elastic ring bands made of special water-resistant material to possess a predetermined tension which is strong enough to resist an upward force generated by continuously growing sprouts, said elastic ring bands being separately put around said upper and lower hooks on said pressure cover member and said support member, respectively, to elastically and detachably bind said two members together.

* * * * *